Patented Mar. 8, 1932　　　　　　　　　　　　　　　　　1,848,914

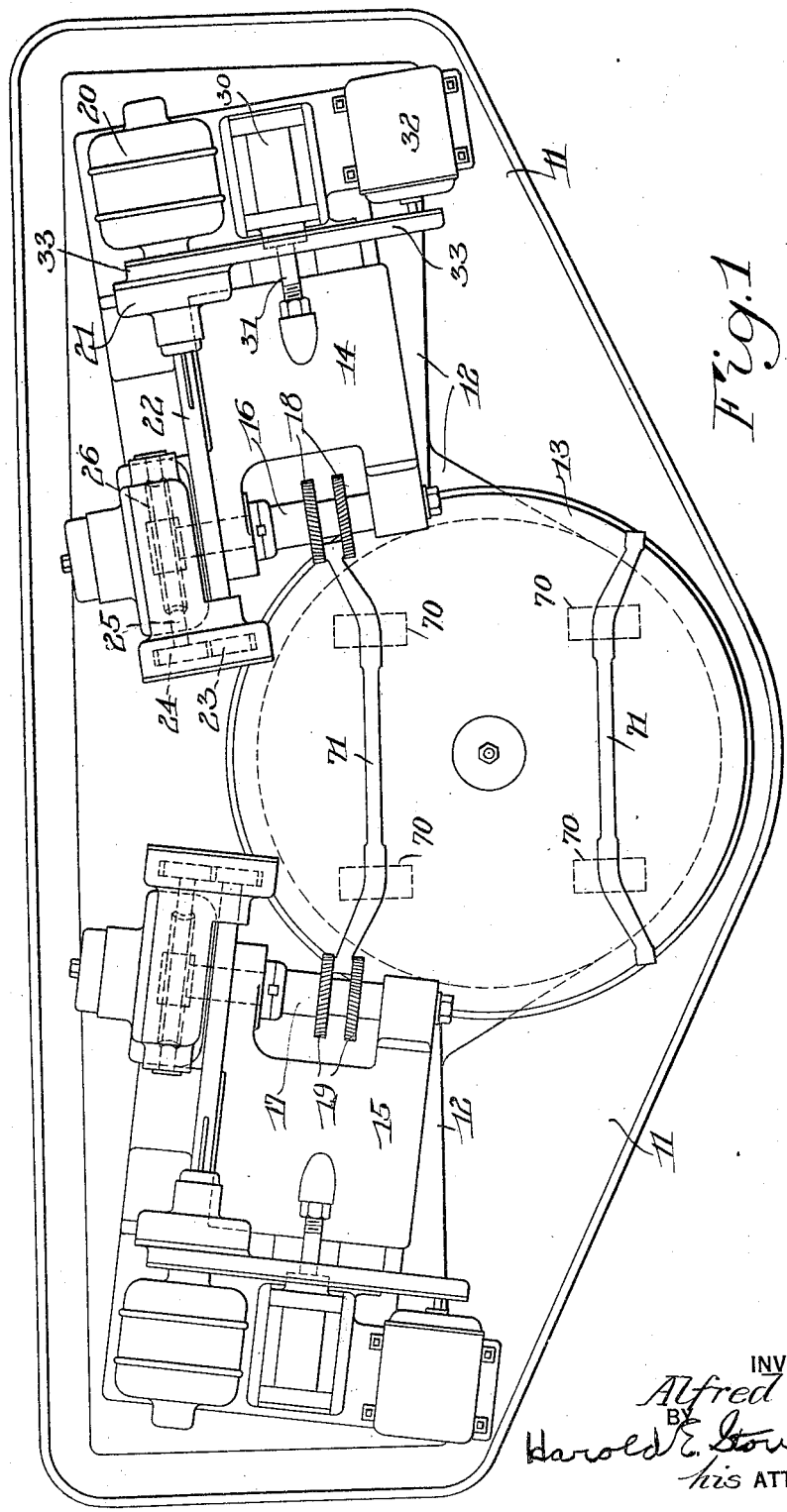

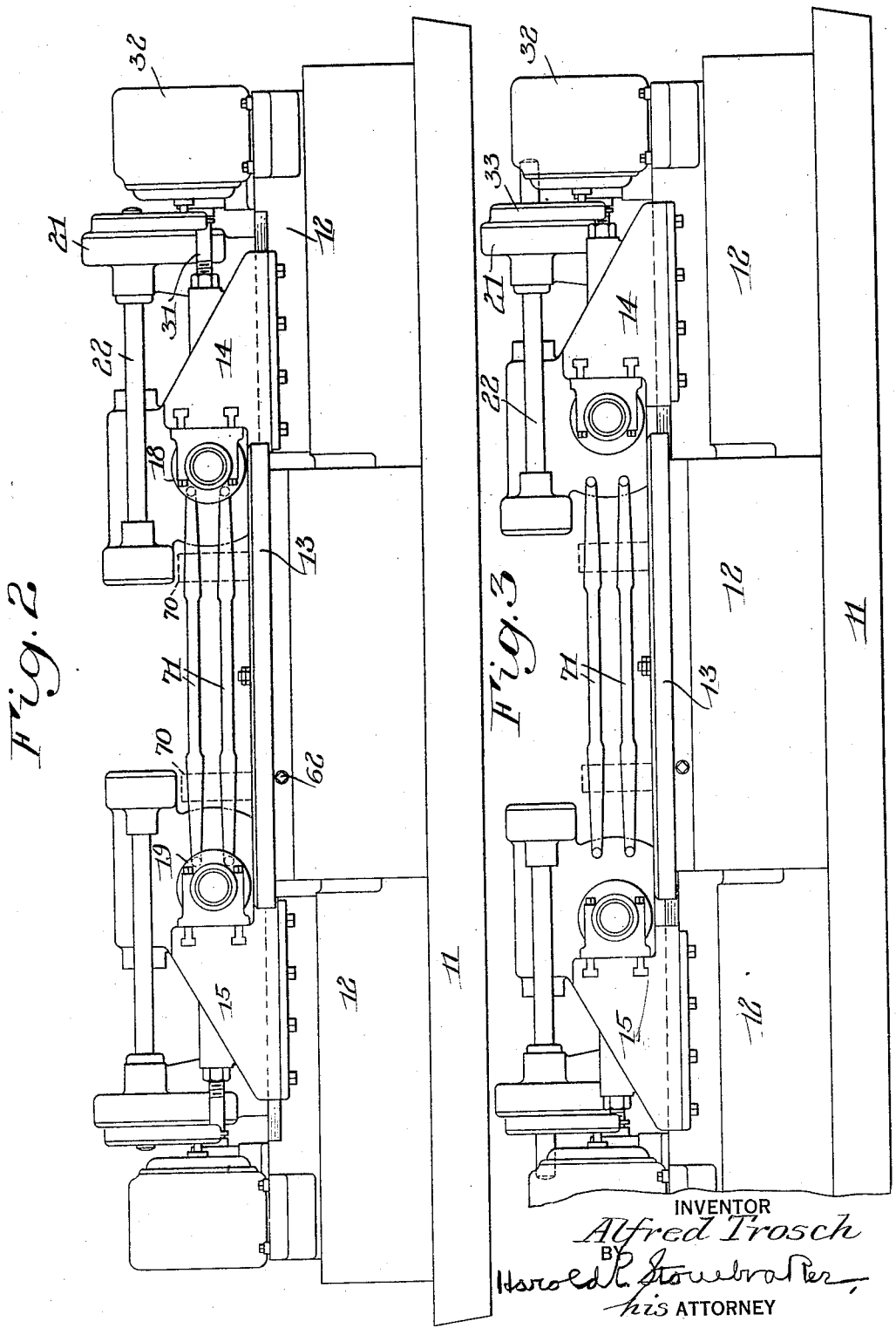

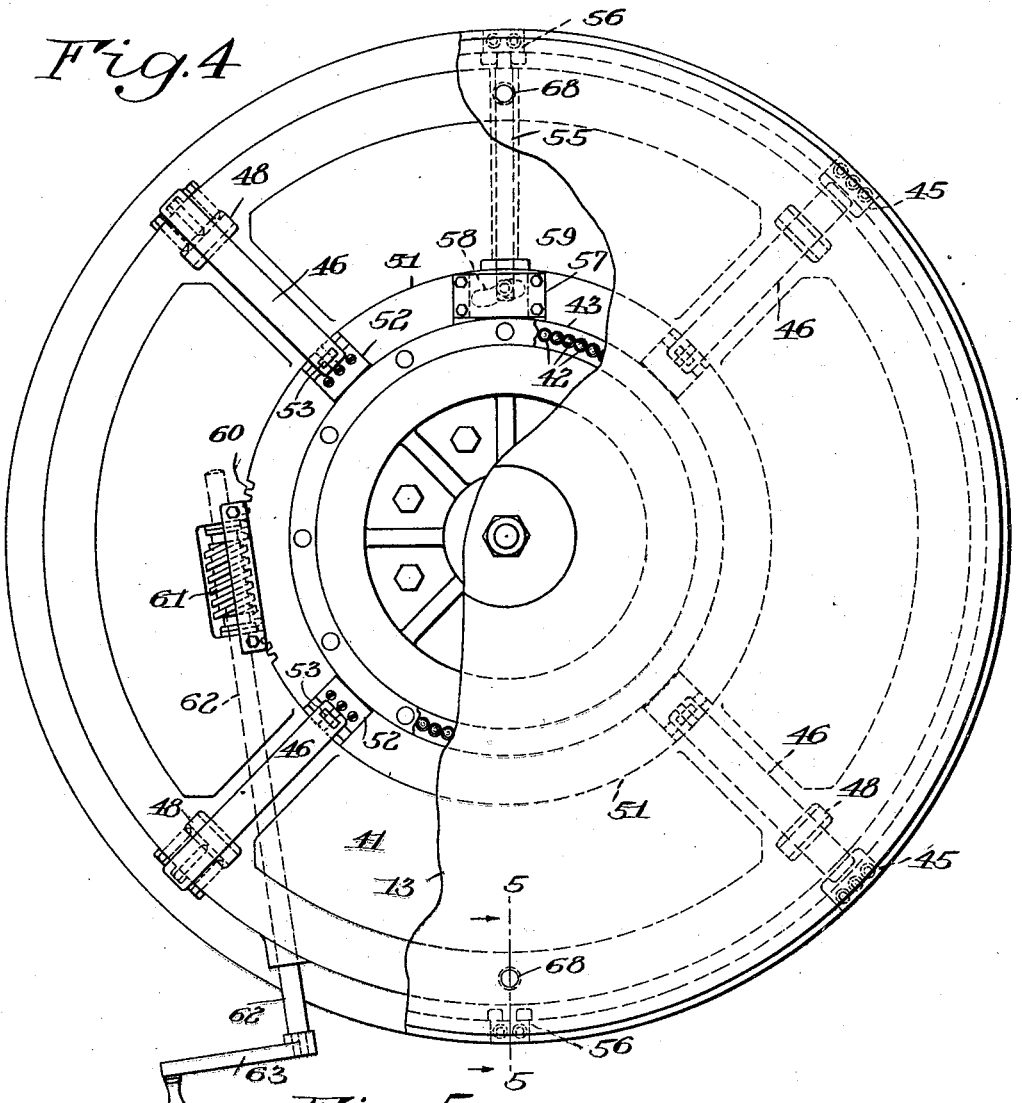
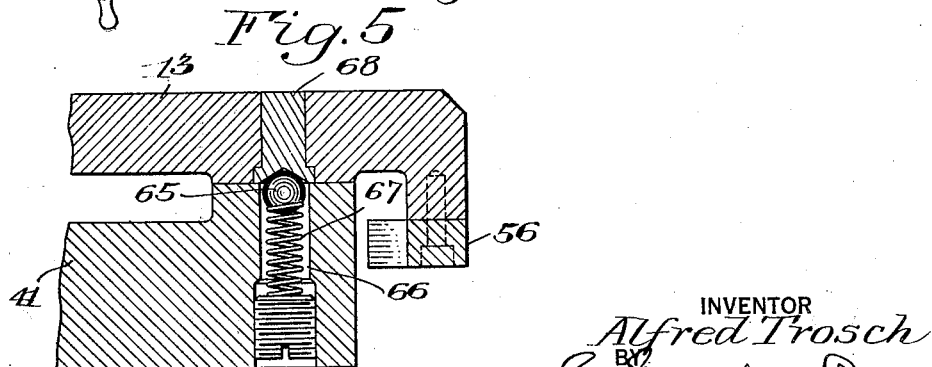

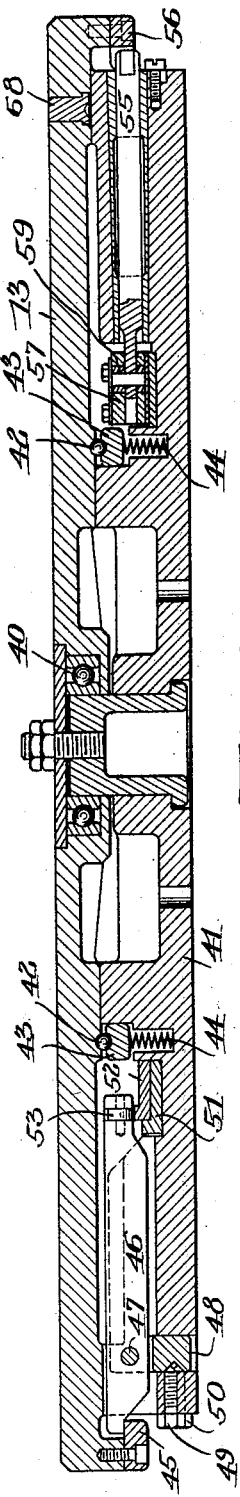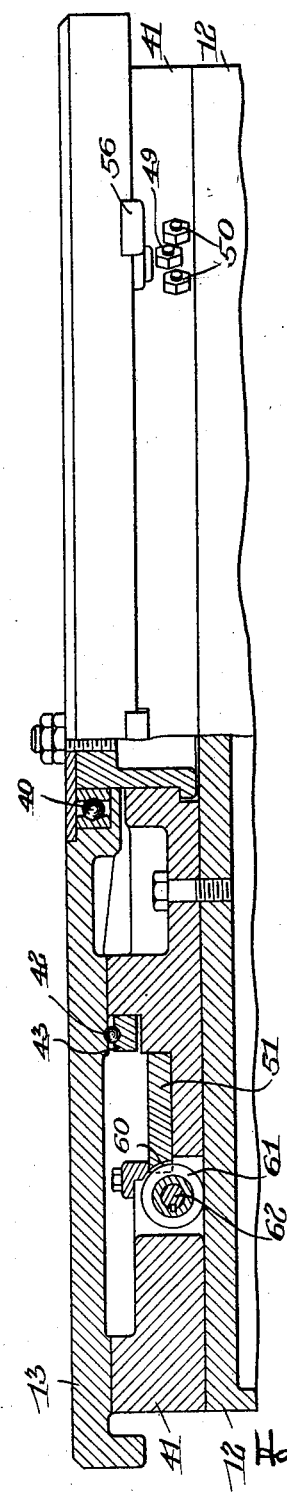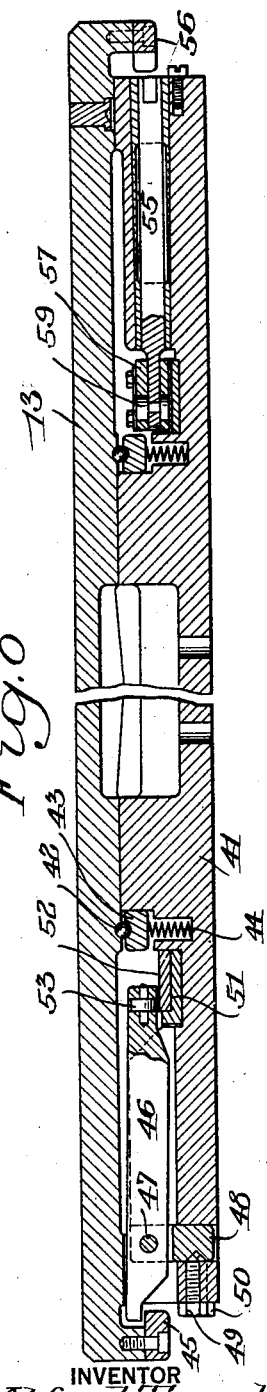

UNITED STATES PATENT OFFICE

ALFRED TROSCH, OF ROCHESTER, NEW YORK, ASSIGNOR TO CONSOLIDATED MACHINE TOOL CORPORATION OF AMERICA, OF ROCHESTER, NEW YORK, A CORPORATION OF DELAWARE

MACHINE TOOL

Application filed December 12, 1927. Serial No. 239,499.

This invention relates to a machine tool, and has for its principal object the provision of a machine tool of generally improved construction which is more reliable, efficient and satisfactory than other similar devices heretofore known.

Another object of the invention is to provide a machine tool especially adapted to finish the ends of automobile axles accurately, rapidly and with a minimum of effort on the part of the operator.

A further object of the invention is to so design a machine of this character that a plurality of pieces of work may be operated upon simultaneously.

It is still another object of the invention to provide a machine tool having a movable work table adapted to hold a plurality of pieces of work at different points thereon, the work table being movable to various positions to determine which piece of work shall be acted upon by the tools, and the tools then being movable relatively to the work table so as to bring them into and out of cooperation with the selected piece of work.

With these and other ends in view, the invention comprises the structure and combination of parts which will appear more clearly from the following description when read in conjunction with the accompanying drawings, the novel features being pointed out in the claims following the description.

In the drawings:

Figure 1 is a plan of a machine illustrating one possible embodiment of the invention;

Figure 2 is a front elevation thereof showing the tools in engagement with the work;

Figure 3 is a view similar to Figure 2 showing the tools out of contact with the work;

Figure 4 is a plan of one possible embodiment of the work table with parts broken away;

Figure 5 is a vertical section taken approximately on the line 5—5 of Figure 4;

Figure 6 is a vertical section through the clamping and locking mechanism of the work table showing the parts in their effective position in which the work table is held against movement;

Figure 7 is a view partly in elevation and partly in section illustrating details of the work table, and Figure 8 is a view similar to Figure 6 showing the clamping and locking mechanism in its ineffective position, permitting the work table to be moved.

One possible embodiment of the invention will now be described in detail with particular reference to the drawings. The embodiment shown and described is a machine especially adapted for milling the ends of front axles of automobiles, but it should be understood that many of the features of the invention are not limited to a machine of this kind but are applicable equally well to other types of milling machines and to other machine tools in general.

Referring especially to Figures 1, 2 and 3, it will be seen that there is provided a bed plate 11 on which the frame 12 of the machine rests. On a part of this frame 12 there is mounted a movable work support such as the rotatable work table 13, the details of which will be described below. On the frame 12 there are also mounted two tool carriages 14 and 15, each reciprocable on suitable guideways. The tool carriages carry tool spindles 16 and 17 respectively and suitable tools 18 and 19 are mounted on these spindles. As the mechanisms for driving the two tool spindles and for reciprocating the two carriages are reverse duplicates of each other, only one set of mechanism will be described, and it is believed that this will be sufficient for a complete understanding of both sets.

Taking up now the mechanism for driving the spindle 16 on the right hand tool carriage 14, it will be seen that a driving motor 20 is mounted on the stationary frame 12 of the machine. This motor 20 is connected to drive, through suitable gearing, a driving member such as a spur gear within the housing 21. A shaft 22 is mounted on the reciprocable tool carriage 14 and is splined or loosely keyed to the gear within the housing 21, so that the shaft may slide longitudinally through the gear in response to the reciprocations of the tool carriage and yet will remain always operatively connected to the gear.

On the left hand end of the shaft 22 is a gear 23 meshing with a gear 24 on a shaft 25, as shown in dotted lines in Figure 1. A worm on the shaft 25 meshes with a worm wheel 26 fixed to the tool spindle 16. Thus the rotations of the motor 20 will be transmitted to the driving member or gear within the housing 21, and from it to the shaft 22, which will thus drive the tool spindle 16 and the tools 18 thereon. The speed ratio between the driving motor and the tool spindle may be changed easily at any time simply by removing the gears 23 and 24 from the shafts 22 and 25 respectively, and substituting other gears of different diameters.

For reciprocating the tool carriages 14 and 15 so as to bring the tools into cooperation with pieces of work mounted on the work support 13, hydraulic means are preferably employed. In the embodiment here shown, a hydraulic cylinder 30 is mounted on the stationary frame 12, and the piston within this cylinder is operatively connected by means of the piston rod 31 to the tool carriage 14. Thus the motion of the piston, caused by forcing fluid into one end or the other of the cylinder, is transmitted to the tool carriage and results in reciprocation thereof.

Means such as the oil pump 32, of known construction, may be employed for operating the hydraulic cylinder 30. Preferably the oil pump is driven by suitable means such as a sprocket and chain drive within the housing 33, from some part which is rotated by the motor 20. Suitable control mechanism (not shown) is employed for controlling the action of the oil pump 32 so that the piston of the hydraulic cylinder may be operated in the proper direction and at the proper rate when desired.

It will be understood that the mechanism above described, designated by the numerals 20 to 33 inclusive, is used for reciprocating the right hand tool carriage 14 and for driving the tool spindle 16 on this carriage; and that similar mechanism, a reverse duplicate of that above described, is used for reciprocating the left hand tool carriage 15 and for driving the spindle 17 thereon.

The work table 13, mentioned above, is rotatable about a center bearing 40, and rests upon a block 41 fixed to the top of the stationary frame 12. The weight of the table is supported almost entirely by the ball bearings 42 in a raceway 43 constantly urged upwardly by springs 44. The tension of these springs is so adjusted that practically the entire weight of the table rests upon these ball bearings, so that these bearings are almost but not quite sufficient to lift the table off of the block 41. Thus there is practically no friction between the lower surface of the table 13 and the upper surface of the block 41 upon which it rests, and therefore the table may be turned with the utmost ease when it is unclamped. The lower surface of the table is, however, always in contact with the upper surface of the block 41, and therefore there is no danger of the table wobbling while it is being turned, nor of its getting out of alinement when it is being clamped down upon the block 41 by the mechanism now to be described.

One form of clamping mechanism for holding the work table 13 rigid with respect to the block 41 and frame 12 is illustrated in Figures 4, 6, 7 and 8. A number of inwardly extending lugs 45 may be secured to the lower edge of a depending flange formed around the periphery of the work table and a corresponding number of clamping levers 46 are arranged to bear downwardly, when desired, on the upper surfaces of these lugs 45. These clamping levers may be fulcrumed at 47 in blocks 48 which are vertically movable so as to allow for adjustment, the vertical movements of these fulcrum blocks being controlled by adjusting screws 49 and 50 engaging the upper and lower surfaces respectively of V-shaped notches or grooves formed in the sides of the blocks. Loosening of an upper adjusting screw 49 and tightening of the corresponding lower screws 50 will move the associated fulcrum block 48 downwardly, while loosening of the screws 50 and tightening of the screw 49 will move the same block upwardly. Thus the various clamping levers 46 may be adjusted so that they all bear evenly upon the lugs 45.

For moving the clamping levers from effective to ineffective position and vice versa, cam means may be employed such as the cam ring 51 rotatably mounted in a suitable circular bearing surface in the block 41. This cam ring underlies the inner ends of the clamping levers 46 and carries a cam piece 52 fixed to the cam ring at a point under the inner end of each of the clamping levers 46. Each cam piece has a tapered or wedge-shaped cam thereon, higher at one end than at the other, and an anti-friction roller 53 is mounted on each of the clamping levers 46 in such a position that it will ride along the top of the cam when the cam is moved relatively to the lever. From this it will be apparent that when the cam ring 51 is moved through a fraction of a revolution so as to bring the high ends of the cams under the clamping levers 46, the inner ends of these levers, carrying the rollers 53, will be elevated and the outer ends will be depressed, thus bearing downwardly upon the lugs 45 and clamping the work table 13 solidly to the stationary block 41, as shown in Figure 6. Similarly, when the cam ring is moved slightly in the opposite direction so as to bring the low ends of the cams under the rollers 53, the inner ends of the clamping levers 46 will be allowed to drop downwardly to the position shown in Figure 8 and the outer ends of the levers will move upwardly, thus freeing the lugs 45 and allowing the work table to be rotated.

The clamping levers above described will exert considerable downward pressure upon the work table 13, so that the friction between the levers 46 and the lugs 45, and also between the lower surface of the work table and the upper surface of the block 41, will tend to prevent accidental turning of the table. As an added precaution against possibility of turning, and also to insure that the table is correctly alined before it is clamped, locking mechanism may be employed such as the locking bolt 55 (Figures 4, 6 and 8) arranged to be projected out into a recess in a lug 56 fixed to the table. This locking bolt is preferably moved simultaneously with the clamping levers and by the same cam ring 51 which controls these levers. At a point opposite the inner end of the bolt 55, plates 57 may be attached to the cam ring 51 and these plates may have cam slots 58 formed therein, the size of the cam slots cooperating with rollers 59 attached to the inner end of the locking bolt 55. The shape of the cam slots 58 is so arranged that when the clamping levers 46 are moved to their effective or clamping position, the bolt 55 is projected out into the recess in the lug 56, as shown in Figure 6. When the cam ring 51 is moved so as to place the clamping levers in their ineffective position, on the other hand, the locking bolt is then withdrawn from the recess in the lug 56, as shown in Figure 8, and the work table 13 is free to rotate without hindrance either from the clamping levers or from the locking bolt.

For moving the cam ring 51 so as to clamp or unclamp the work table, various means may be employed. For instance, gear teeth 60 may be formed on a portion of the cam ring, and a worm 61 on a shaft 62 may mesh with these gear teeth, as shown in Figures 4 and 7. By turning the shaft 62 by means of a handle 63 thereon, the worm 61 will move the cam ring 51 through a fraction of a revolution and will thus clamp or unclamp the work table as desired.

A work table such as that here disclosed may carry a plurality of pieces of work at different points on the table, the table being turned from time to time so as to bring first one piece of work and then another into proper position to be acted upon by the tools. In the embodiment here shown, the table is adapted to hold work at two different points, the work in one position being operated upon by the tools while the work in the other position is being loaded or unloaded. It should be understood, however, that the invention is not limited to holding work at only two positions and that the use of a table holding any desired number of pieces of work is contemplated.

For a table holding work in two positions, as in the present instance, it is obviously necessary to be able to clamp the table in two different positions, so that either piece of work may be brought into the line of action of the tools. The table here shown is adapted to hold the different pieces of work at diametrically opposite points, and therefore the two clamping positions of the table should be 180° apart. Two of the locking lugs 56 are therefore provided, spaced 180° apart, as shown in Figure 4. When the table is turned so as to bring one piece of work into the line of action of the tools, the bolt 55 will be in line with the recess in one of the lugs 56; and when the table is turned to its other position, so as to bring the other work into the range of action of the tools, the locking bolt 55 may then be projected into the recess in the other lug 56. The clamping lugs 45 and clamping levers 46 are arranged symmetrically about a diameter joining the two lugs 56, and therefore the levers 46 will cooperate effectively with the lugs 45 no matter in which of its two positions the table may be.

To assist the operator in alining the table accurately in either of its two positions before clamping it, means may be employed such as the spring detent shown in Figures 4 and 5. This arrangement comprises a ball 65 in a recess 66 formed in the block 41, this ball being constantly urged upwardly against the lower surface of the table 13 by a spring 67. Two plugs 68 having slightly recessed lower ends are inserted in the table 13 in such position that one of them will overlie the ball 65 when the table is correctly alined in either of its two effective positions. When the table is thus alined, the ball will be seated in the recess in the plug 68 and will retain the table frictionally in the desired position. The operator can thus tell by the feel of the table when it is accurately alined.

Referring now to Figures 1, 2 and 3, it will be seen that clamping mechanism indicated diagrammatically at 70 is mounted upon the top of the rotatable work table 13. There are two groups of clamping mechanism mounted 180° apart, as clearly shown in Figure 1. This clamping mechanism is made of any appropriate form so as to hold the desired kind or shape of work. The machine here shown by way of illustration is intended to mill the ends of automobile axles 71 and therefore the clamps in the present instance are designed to hold work of this character. It will be seen from Figures 2 and 3 that each of the two sets of clamps preferably accommodates two axles, arranged one above the other. Thus two axles are operated upon concomitantly by the tools, and this results in extremely rapid and economical production, which is of great importance in modern manufacturing methods.

A brief résumé of the operation of the machine will now be given. Let it be assumed that the main motors 20 are running, that the milling cutters have just finished working upon the pair of axles at the back of the work table, and that a fresh pair of axles has been inserted by the operator in the clamping mechanism at the front of the work table. The operator now turns the shaft 62 so as to unclamp the work table 13, and then rotates this table through half of a revolution until the fresh pair of axles is at the back and the finished pair is brought around to the front. When the table has been correctly alined in its new position by the seating of the detent ball 65 in the recess in the plug 68, the operator then turns the shaft 62 in the opposite direction so as to clamp the table firmly by means of the levers 46 and the bolt 55. The parts are now in the position shown in Figure 3. He then operates the controls of the oil pumps 32 so that the tool carriages 14 and 15 commence to move forwardly toward the work table. During this movement the tool spindles 16 and 17 are constantly rotating and when the tool carriages have advanced far enough, the tools 18 and 19 on these spindles come into cooperation with the ends of the axles 71 and mill both axles of the superimposed pair. At the end of the forward movements of the tool carriages 14 and 15, the parts are in the position shown in Figures 1 and 2. The controls of the oil pumps 32 are now shifted, either manually or automatically, so that the tool carriages 14 and 15 begin their backward motion and move away from the work table to their original position shown in Figure 3.

While the tool carriages were reciprocating, the operator has unclamped the two finished axles from the clamping mechanism at the front of the work table and has inserted two fresh axles in these clamps. Therefore, by the time the tool carriages have returned to their normal or Figure 3 position, the work table 13 is now ready to be unclamped and turned once more through half a revolution, so as to place the fresh axles at the rear of the table where they can be acted upon by the tools, and to bring the newly finished axles to the front where they can be removed from the machine and replaced by fresh axles. This cycle of operation may be repeated indefinitely.

As each of the tool carriages and tool spindles is controlled independently by a separate motor, it is apparent that great flexibility of operation is secured. Normally, the two tool carriages will move forwardly and rearwardly together; but if the necessity should arise for operating upon one end of an axle in a manner slightly different from the other end, either of the tool carriages may be moved independently of the other, and the speed of either of the tool spindles may be adjusted independently as desired.

It will now be seen that a generally improved tool has been shown which is capable of rapid, accurate, and economical operation. While one embodiment of the invention has been disclosed, it is to be understood that the inventive idea may be carried out in a number of ways. This application is therefore not to be limited to the precise details shown, but is intended to cover all modifications thereof falling within the spirit of the invention or the scope of the appended claims.

I claim:

1. In a machine tool, the combination with a frame having guideways thereon, a support for a work piece mounted on said frame, of a tool carriage slidable in said guideways toward and from the work support, a tool spindle rotatably mounted on said tool carriage, a cutting tool on said spindle, a shaft mounted on said tool carriage and operatively connected to said tool spindle for driving the same, a driving member fixed to the frame of the machine and operatively connected to said shaft so that the shaft may move longitudinally with respect to said driving member in response to movements of the tool carriage, means for driving said driving member to rotate said shaft to drive said tool spindle and tool, and means for moving said tool carriage to move said tool into and out of cooperation with the work.

2. In a machine tool, the combination with a frame having guideways thereon, a support for a work piece mounted on said frame, of a tool carriage slidable in said guideways toward and from the work support, a tool spindle rotatably mounted on said tool carriage and extending substantially perpendicular to the line of movement of said tool carriage, a cutting tool on said spindle, a worm wheel also on said spindle, a worm for driving said worm wheel, a shaft mounted on said carriage substantially parallel to the line of travel of said carriage, operative connections between said shaft and said worm, a driving member fixed to said frame in alinement with said shaft, said shaft being movable longitudinally through said driving member in response to the movements of said tool carriage and operatively connected to said driving member throughout the range of movement of said carriage, a motor for driving said driving member to rotate said shaft and drive the tool, and means driven by said motor for moving said tool carriage to move the tool into and out of cooperation with the work.

3. In a machine for milling the ends of automobile axles and the like, the combination with a frame, of a work table mounted in said frame to turn about a fixed axis and adapted to hold a plurality of work pieces arranged on its upper face on opposite sides of its axis, a plurality of tool carriages movable in opposite directions toward and from the work table, a tool spindle on each of said carriages, a cutting tool on each of said spindles, means for turning said work table to bring a selected work piece into the paths of movement of said tools, separate driving means mounted on said frame for driving each of said tool spindles, separate hydraulic means driven by each of said driving means for moving its associated tool carriage independently to move the tool on said carriage into and out of cooperation with said selected work piece, and means for locking the work table against rotation while the tools operate on the work.

4. In a machine tool, the combination with a frame having guideways thereon, a support for a work piece mounted on said frame, of a tool carriage slidable in said guideways toward and from the work support, a tool spindle rotatably mounted on said tool carriage, a cutting tool on said spindle, a shaft mounted on said tool carriage and operatively connected to said tool spindle for driving the same, a driving member fixed to the frame of the machine and operatively connected to said shaft so that the shaft may move longitudinally with respect to said driving member in response to movements of the tool carriage, means for driving said driving member to rotate said shaft to drive said tool spindle and tool, a piston fixed on the tool carriage in alinement with the cutting tool so that the tool is arranged in alinement between the piston and the work piece, and hydraulic devices for actuating the piston to move the tool to and from cooperation with the work piece.

In witness whereof, I have hereunto signed my name.

ALFRED TROSCH.